United States Patent

Suzuki et al.

[11] Patent Number: 5,567,874
[45] Date of Patent: Oct. 22, 1996

[54] ROTARY POSITION DETECTING DEVICE

[75] Inventors: Haruhiko Suzuki, Anjo; Takahiro Tamura, Kariya; Masahiko Miyahara, Chiryu; Hiroaki Yamaguchi, Anjo; Hideaki Ohuchi, Takahama; Akira Kondo, Aichi-gun; Toshikazu Matsushita, Anjo, all of Japan

[73] Assignee: Nippondenso Co., Ltd., Kariya, Japan

[21] Appl. No.: 427,854

[22] Filed: Apr. 26, 1995

[30] Foreign Application Priority Data

May 24, 1994 [JP] Japan .................................. 6-135127
Feb. 16, 1995 [JP] Japan .................................. 7-053420

[51] Int. Cl.$^6$ ............................................... G01M 15/00
[52] U.S. Cl. ............................................... 73/118.2
[58] Field of Search ........................ 73/118.1, 118.2, 73/3, 23.32, 117.2, 117.3, 861.08

[56] References Cited

U.S. PATENT DOCUMENTS

| | | | |
|---|---|---|---|
| 4,417,468 | 11/1983 | Yasuda et al. | 73/118.1 |
| 4,616,504 | 10/1986 | Overcash et al. | 73/118.1 |
| 4,679,440 | 7/1987 | Okamura | 73/118.1 |
| 4,715,220 | 12/1987 | Eitoku et al. | 73/118.1 |
| 4,719,795 | 1/1988 | Eitoku et al. | 73/118.1 |
| 4,866,981 | 9/1989 | Matsumoto et al. | 73/118.1 |
| 4,893,501 | 1/1990 | Sogawa | 73/118.1 |
| 4,961,342 | 10/1990 | Matsumoto et al. | 73/118.1 |
| 5,070,728 | 12/1991 | Kubota et al. | 73/118.1 |
| 5,321,980 | 6/1994 | Hering et al. | 73/118.1 |

FOREIGN PATENT DOCUMENTS

| | | |
|---|---|---|
| 62-97909 | 6/1987 | Japan . |
| 62-182449 | 8/1987 | Japan . |
| 4-112930 | 4/1992 | Japan . |

*Primary Examiner*—Richard Chilcot
*Assistant Examiner*—Eric S. McCall
*Attorney, Agent, or Firm*—Cushman, Darby & Cushman

[57] ABSTRACT

A rotary position detector comprises an integrally molded rotor made of a synthetic resin to which a contact is fixed, a housing and a cover member on which a resistance circuit surface is formed. A contact surface and the resistance circuit surface to which the contact is attached has a cylindrical recess disposed on the same axis center as the shaft or a protrusion engaging in the recess. Alternatively, the resistance circuit surface may be provided on the rotor and the contact is provided on the cover member. A terminal contact which integrates an external contact terminal and a contact may be employed.

12 Claims, 8 Drawing Sheets

5,567,874

ROTARY POSITION DETECTING DEVICE

CROSS REFERENCE TO RELATED APPLICATIONS

This application is based upon and claims priority of Japanese Patent Applications No. 6-135127 filed on May 24, 1994 and No. 7-53420 filed on Feb. 16, 1995, the contents of which are incorporated herein by reference.

BACKGROUND OF THE INVENTION

1. Field of the Invention

The present invention generally relates to a rotary position detecting device designed to convert an angle of rotation of a throttle valve and the like into a corresponding resistance value.

2. Related Art

A Rotary position detecting device used to detect the opening angle of a throttle valve or the like is designed to transmit the movement of an object of detection like a valve shaft or the like and to convert the amount of rotation of a rotor to a corresponding resistance value.

As shown in FIG. 14, for example, a rotary position detecting device 9 disposes a base plate 91 having a resistance circuit surface at the underside thereof and a rotor 92 having contacts 931 and 932 touching the resistance circuit surface in a manner to face each other in a housing 94. The rotor 92 is connected mechanically to the object of detection by certain means and rotated, for example, by means of a lever 941.

As a result, as shown in FIG. 15, first contact 931 slides over resistances 911 and 912 and changes the resistance value between the contacts 951 and 952 depending on the amount of rotation. Second contact 932 short-circuits or opens the connection between conductors 913 and 914 depending on the rotary position of the rotor 92 and thus a specific rotary position can be detected at detection terminals 953 and 954. In FIG. 15, numeral 943 is a coil spring which forces the contacts 931 and 932 against the resistance circuit surface with an appropriate contact pressure (Japanese Utility Model Unexamined Publication No. S62-97909).

Here, in order to accurately detect the rotary position, it is important to precisely adjust the relative position between the resistance circuit surface and the contacts 931 and 932. It should be noted that shaft 921 of the rotor 92 and bearing 942 of the housing 94 are made of metals and main body 922 of the rotor 92, to which the contacts 931 and 932 are attached, is made of an insulating material. In addition, the rotor 92 has the shaft 921 secured to the main body 922 by means of the insert casting or with screws.

The contacts 931 and 932 are, as shown in FIG. 16 and FIG. 17, fixed to the main body 922 of the rotor 92 using a snap washer 934 or the like. The resistance circuit surface is formed on the base plate 91 which is made of an insulating material such as ceramics or resin. On the other hand, the base plate 91 is, as shown in FIG. 14, fixed to a cover 97 via a packing 971. Resistance circuit surface of the base plate 91 is connected to terminals 951 through 954 via a conducting material 96 or the like.

Other than the above-mentioned construction in which the lever 941 fixed to the shaft 921 is rotated by a not-shown valve shaft, it is also known a structure to join the object of detection such as the throttle valve shaft or the like and the rotor 92, in which a fitting hole is provided on the axial center of the shaft 921 to engage or fit the valve shaft. Here, the bottom of the housing 94 is engaged in a recess or the like on the external wall of throttle valve body (Japanese Patent Unexamined Laid-open Publication No. H4-112930). In other words, a tapered protrusion is provided at the bottom of the housing 94 while a recess of the same taper is provided on the valve body side in order to stably install the rotary position detecting device 9 on the throttle valve body.

As another example, the terminal may be, as shown in FIG. 18, constructed in a manner that a conducting member 990 contacting the resistance circuit surface is welded to a terminal 960. The conducting member 990 is made of an elastic material and forces its top section 991 against the resistance circuit surface by the elastic force of recovery which is generated by pressing.

As yet another example of the rotary position detecting device, there is a type of construction in which the resistance circuit surface is formed at the rotor side and the contact is provided on a plate member fixed to the housing (Japanese Patent Unexamined Laid-open Publication No. S62-182449).

However, the rotary position detecting devices according to prior arts have the following problems.

That is, many parts are required to determine the relative position between the resistance circuit surface and the contact and it takes time for the assembly work and adjustment work. Where many parts are used, the relative position between the resistance circuit surface and the contact tends to change and fluctuate depending on the dimensional deviations of respective parts. Cost will also rise as the parts cost as well as the number of assembly work-hours increase.

SUMMARY OF THE INVENTION

In consideration of such problems of the prior arts, the present invention intends to provide a rotary position detecting device, which has a simple structure with less number of parts, can be easily assembled and assures a high accuracy.

According to the present invention, a shaft and a main body of a rotor are molded integrally by synthetic resin as an integral member, and further a cover member disposed opposite to the main body of the rotor is also molded by synthetic resin. Thus, the number of parts as well as the assembly work hours are reduced and the device can be produced with a low cost. Further, a resistance circuit surface is formed on the cover member as an integral member and further a contact surface which has a contact touching the resistance circuit surface is molded integrally with the main body of the rotor in a manner to support one end of the rotor with the housing and the other end with the cover member. Thus, the error at assembly work is reduced owing to reduced number of parts, the displacement of the relative position between the resistance circuit surface and the contact is prevented. Further, the rotor is supported with two members, that is, the housing and the cover, and hence the inclination of the rotor during revolution is prevented and thus the accuracy of position detection monitored on the resistance circuit surface and the contact surface is enhanced.

Preferably, a pair of recess and protrusion which engage each other are provided on the resistance circuit surface of the cover member and the contact surface of the rotor. Thus, positions of the resistance circuit surface and the contact surface can be easily adjusted at assembly work.

Preferably, a terminal contact is formed integrally to serve not only as an external contact terminal but also as the resistance circuit surface. In other words, since the external contact terminal and the contact surface are not separated but united, the number of parts is reduced and the assembly is simplified further.

More preferably, the cover member and the housing are made of same material and welded each other so that a clearance between these two members is eliminated resulting in a better air-tightness. In addition, use of a seal member inserted between these members can be eliminated.

DETAILED DESCRIPTION OF THE PREFERRED EMBODIMENTS

The present invention is described in detail with reference to preferred embodiments shown in the accompanying drawings.

[First Embodiment]

Figure 1:
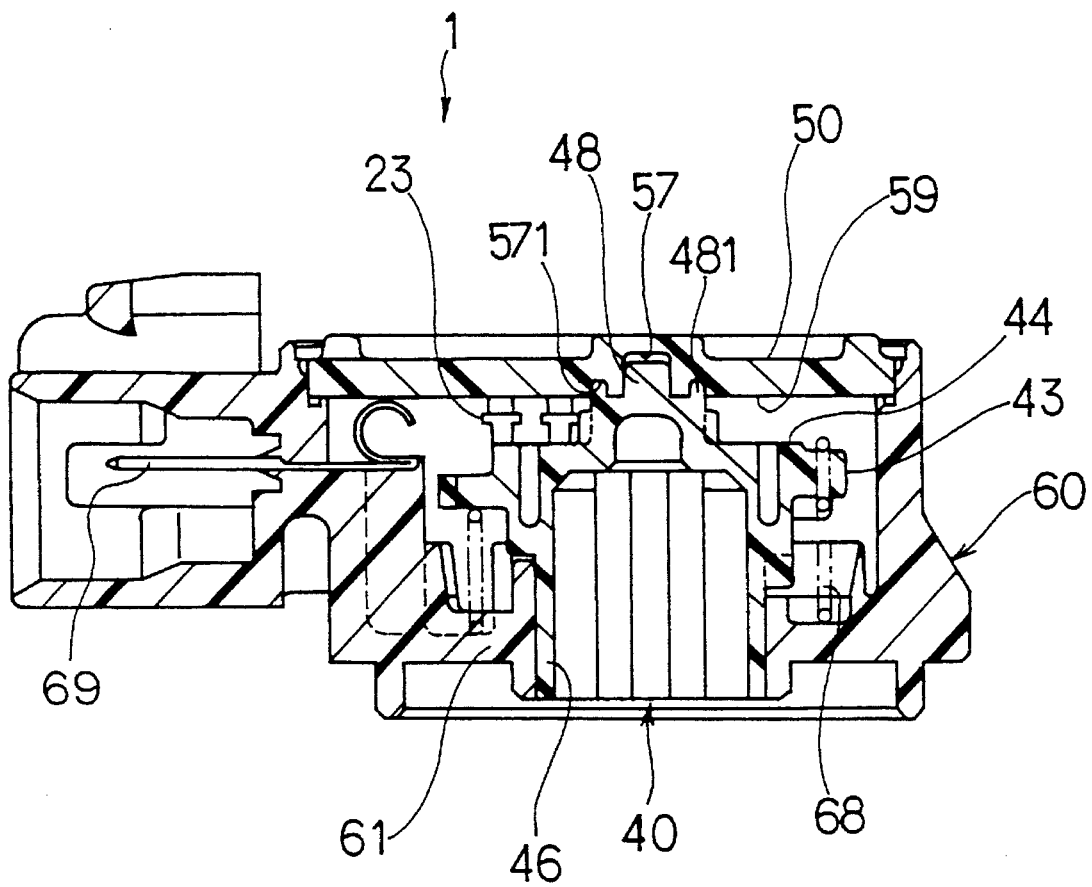
FIG. 1 is a cross-sectional view illustrating a rotary position detecting device according to the first embodiment.
Figure 2:
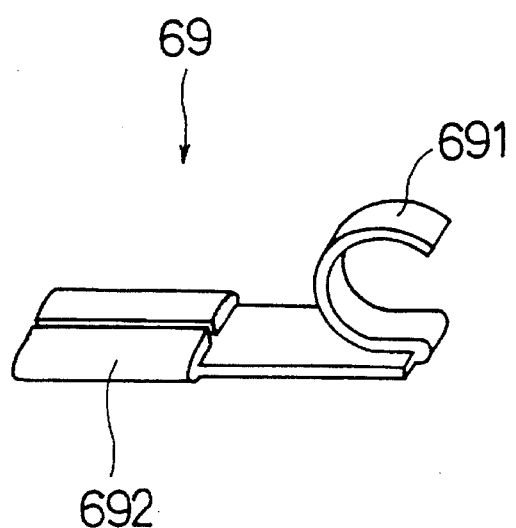
FIG. 2 is a perspective view illustrating the rotary position detecting device according to the first embodiment.

The first embodiment of a rotary position detecting device according to the present inventions is explained, referring to FIG. 1 and FIG. 2

In FIG. 1, the rotary position detecting device 1 is adapted to convert the angle or rotation of a shaft 46 to a resistance value. The rotary position detecting device 1 comprises a rotor 40 which is made of a synthetic resin that forms the shaft 46 integrally with a main body 43, a housing 60 made of synthetic resin which supports rotatably the shaft 46 of the rotor 40, and a cover member 50 made of synthetic resin which is fixed to the housing 60 and disposed opposite to the main body 43 of the rotor 40. Resistance circuit surface 59 being disposed at right angle against the axial center of the shaft 46 is formed integrally with the cover member 50 at the underside of the cover member 50. On the other hand, a contact surface 44 to which a contact 23 touching the resistance circuit surface 59 is attached and is disposed opposite to the resistance circuit surface 59, is formed on the cover member 50.

In addition, a cylindrical recess 57 having the same axial center as the shaft 46 is formed on the resistance circuit surface 59, and a protrusion 48 which engages in the recess 57 is formed on the contact surface 44. The cover member 50 and the housing 60 are made of the same material and both members 50 and 60 are joined by means of the ultrasonic welding. The shaft 46 of the rotor 40 is made of a liquid crystal polymer of which the crystal orientation of the crystal liquid polymer is disposed at right angle against the revolving direction of the shaft 46.

The rotary position detecting device 1 of the embodiment is designed as a valve opening sensor for the throttle valve of automobile which is not shown in the figure, which transmits the rotation of the throttle valve shaft to the end of the shaft 46 of the rotor 40 via a lever or the like in order to turn the rotor 40.

The rotor 40 is, as shown in FIG. 1, molded by synthetic resin as an integral piece and can be rotated because its shaft 46 is connected to a bearing section 61 of the housing 60. Resistance circuit surface 59 is formed by the screen printing or the like over the bottom surface of the cover member 50.

On the resistance circuit surface 59, a resistance surface, a ground conductor surface and a power supply conductor surface which are not shown, are formed in the same manner as in the prior art (FIG. 16) and a cylindrical recess 57 is provided at the center. In addition, a ring groove 571 is provided around the recess 57. Further, the cover member 50 is joined to the housing 60 by means of the ultrasonic welding. The main body 43 of the rotor 40 has a contact surface 44 to which the contact 23 is attached and, at the center of the contact surface 44, a cylindrical protrusion 48 and a ring-like protrusion 481 are formed at the center of the contact surface 44. The protrusion 48 engages the above-mentioned recess 57 and the ring-like protrusion 481 engages the groove 571.

Further, the contact 23 touches the resistance surface of the resistance circuit surface 59 and the ground conductor surface or the power supply conductor surface. The contact 23 is made of a resilient spring piece and touches the resistance circuit surface 59 with a definite contact pressure.

Between the lower face of the main body 43 of the rotor 40 and the upper face of the bearing 61 of the housing 60, a coil spring 68, which forces the rotor 40 against the resistance circuit surface side, is inserted. Housing 60 is a member made of synthetic resin to which a terminal plate 69 is provided by means of the insert molding and has the bearing section 61, which supports the shaft 46 of the rotor 40 rotatably, at its bottom.

Terminal plate 69 is, as shown in FIG. 2, made of a piece of plate member which is bent and processed by the press work, and has a contact section 691 contacting the end of the resistance circuit surface 59 and an external terminal 692. Contact section 691 has a curved form, which is elastically deformable, is installed in the housing 60 in a state deformed by the pressing force and, owing to the elastic force for recovery, contacts with pressure the end section designed to pick up signals of the resistance circuit surface.

Next, the operation and the effect of the present embodiment are described.

Since the shaft 46 and the main body 43 of the rotor 40 are molded by synthetic resin as an integral member and further the cover member 50 disposed opposite to the main body 43 of the rotor 40 is also formed of synthetic resin, the device is fabricated with a reduced number of parts, the number of assembling process is less as well and thus it can be produced in low cost.

Moreover, since the cover member 50 and the resistance circuit surface 59 are formed integrally, the contact surface 44 provided with the contact 23 contacting the resistance circuit surface 59 is formed integrally with the main body 43 of the rotor 40 in a manner being disposed opposite to the resistance circuit surface 59, one end of the rotor 40 is supported with the bearing 61 of the housing 60 and the other end of the rotor 40 is supported with the cover member 50, a reduced number of component parts further reduces the assembling errors resulting from assembly of respective parts, the dislocation of the resistance circuit surface 59 and the contact 23 is prevented, further the inclination of the rotor during revolution is prevented because the shaft of the rotor 40 is supported with a pair of members, that is, the housing 60 and the cover member 50, and the accuracy of position detection monitored by the resistance circuit surface 59 and the contact surface 44 via the contact 23 is enhanced.

Since on the resistance circuit surface 59 of the cover member 50 and the contact surface 44 of the main body 43 of the rotor 40, the recess 57 and the cylindrical protrusion 48 are provided, the relative position between the resistance circuit surface 59 and the contact surface 44 can be determined quite simply during the assembly work. Since the cover member 50 and the housing 60 are joined circumferentially by means of the ultrasonic welding, no member is required to seal between these two members 50 and 60 so that the number of parts can be reduced.

The contact plate 69 is made integral with the contact surface 691 contacting the resistance circuit surface and the external terminal 692 so that they can be processed with a series of press work. As a result, it becomes unnecessary to perform assembly and welding of the members 691 and 692 and thus the number of parts as well as the cost can be reduced.

As explained above, the present embodiment allows to provide a rotary position detecting device, which employs a simple construction with less number of parts, simplifies the assembly and further ensures an improved accuracy.

[Second Embodiment]

Figure 3:
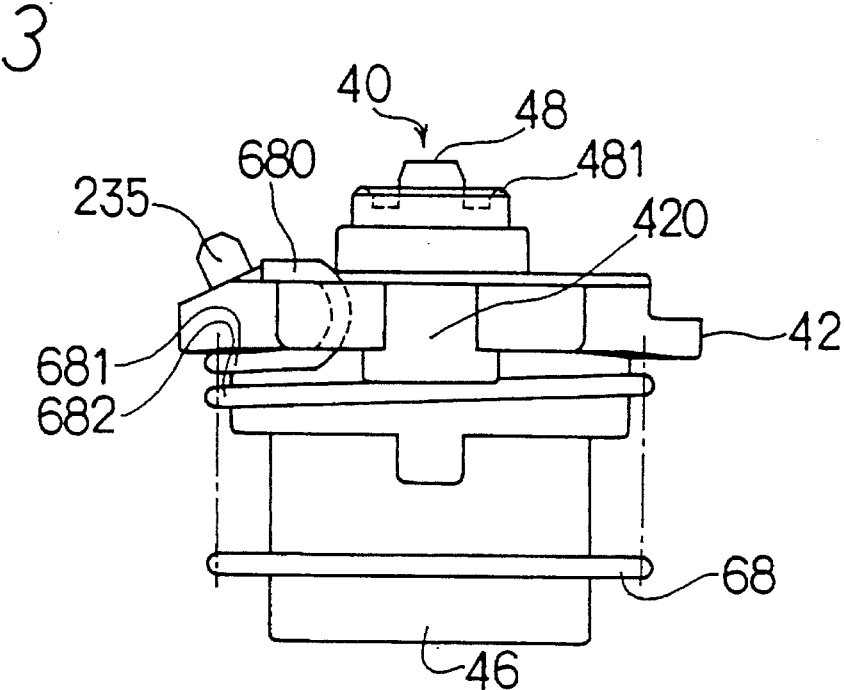
FIG. 3 is a front view illustrating a rotor of a rotary position detecting device according to the second embodiment.
Figure 4:
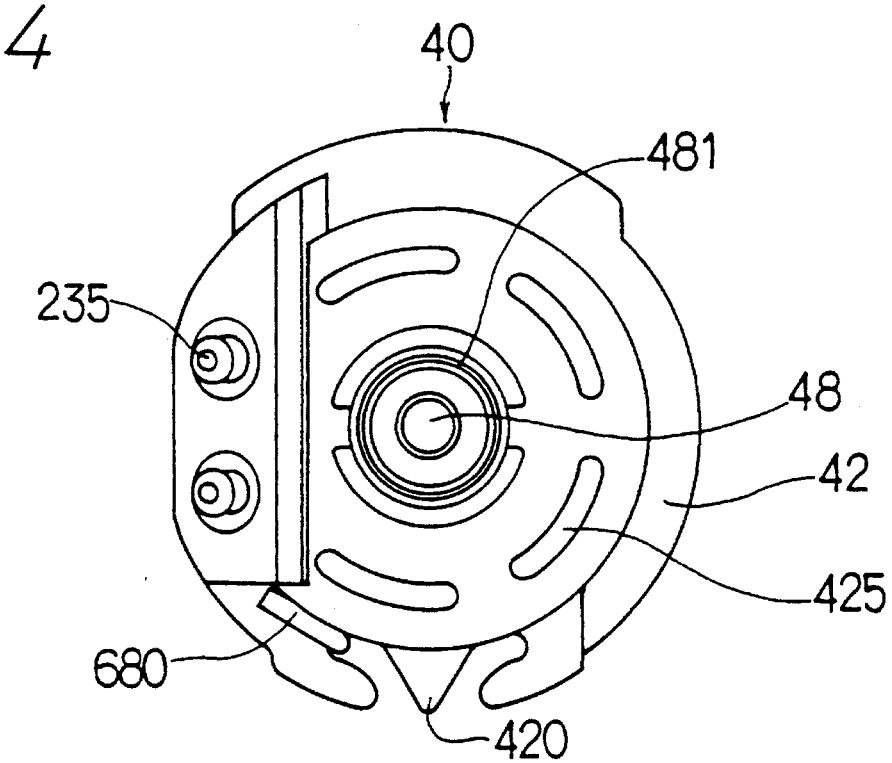
FIG. 4 is a plan view illustrating the rotor of the rotary position detecting device according to the second embodiment.

This embodiment which is a modification of the first embodiment, as shown in FIG. 3 and FIG. 4, employs a stopper 420 of a spring 68 for a main body 42 of the rotor 40.

Stopper 420 which protrudes toward the external periphery, is provided on the main body 42 so that, since a second coil 682 of the spring 68 contacts the bottom face of the stopper 420, it does not contact a first coil 681 fixed to the end of the main body 42. It should be noted that, in FIG. 3 and FIG. 4, numeral 680 indicates a stop end of the spring 68 to the main body 42, numeral 235 a contact retaining pin and numeral 425 a cutout or underfill.

As a result, when the spring 68 is contracted or released, a sliding friction will not be produced between both coils 681 and 682 so that there will not be a problem of dispersed metal powder resulting from friction. Accordingly, the abrasion by friction with adhered metal powder on the resistance circuit surface 59 is restricted and the life as well as the reliability of the rotary position detecting device 1 are enhanced.

Any other feartures are same as in the first embodiment.

[ Third Embodiment]

In this embodiment, some members in the first embodiment are modified in their forms.

Figure 5:
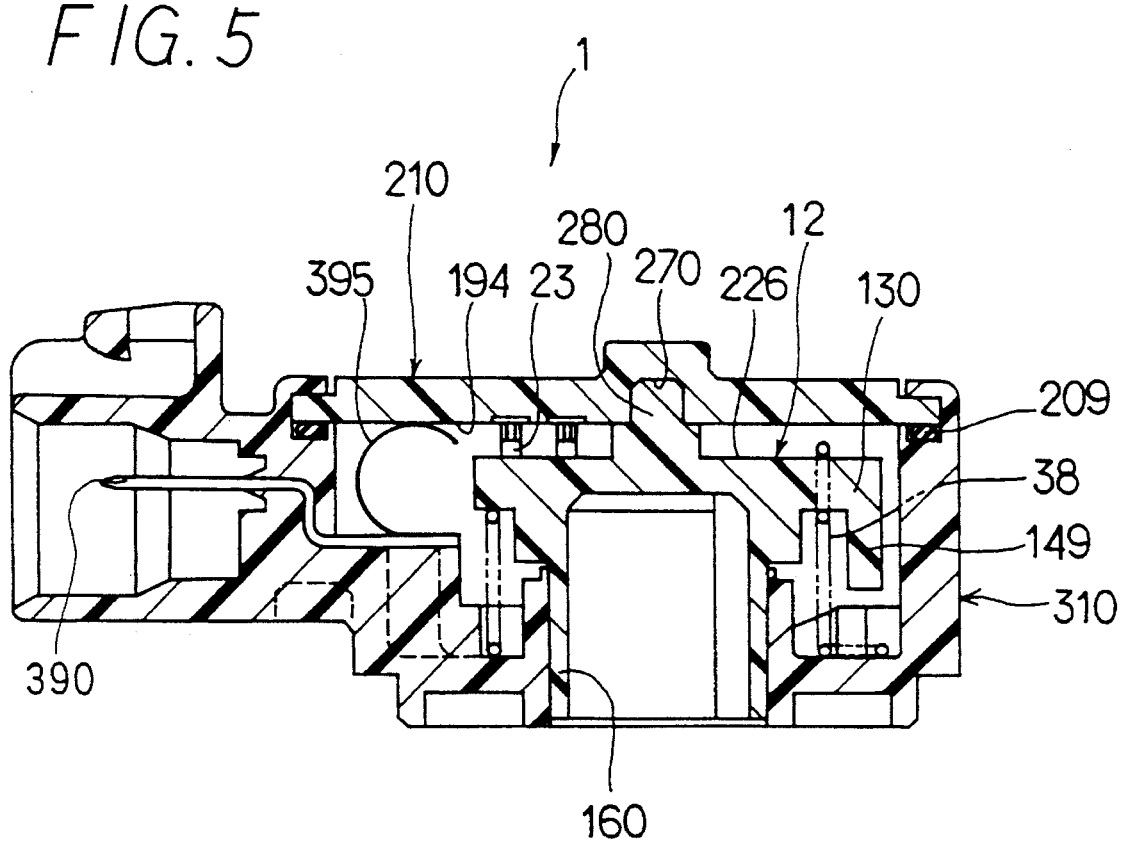
FIG. 5 is a cross-sectional view illustrating a rotary position detecting device according to the third embodiment.

As shown in FIG. 5, a rotor 12 is molded by synthetic resin and integrates a shaft 160 and a main body 130. A housing 310 made of synthetic resin supports the shaft 160, and a cover member 210 made of synthetic resin is fixed to the housing 310. Contact surface 226 having the contact 23 which touches a resistance circuit surface 194, is formed on the main body 130 of the rotor 12. In addition, a recess 270 is formed on the resistance circuit surface 194 and a protrusion 280 which engages in the recess 270, is formed on the contact surface 226. On the other hand, a terminal plate 390 is formed on the housing 310 by the insert molding and the terminal plate 390 is connected to the resistance circuit surface 194 via a resilient conductor 395. Between the housing 310 and the rotor 12, a return spring 38 is disposed. The spring 38 is restricted by a stopper 149 of the main body 130. Cover member 210 is separate from the housing 310 and thus a seal member 209 is inserted between both members 210 and 310.

With the rotary position detecting device according to the embodiment, the rotor 12 is formed integrally of synthetic resin so that it is composed of less number of parts compared with that of prior art. Therefore, as a whole, the number of parts as well as the number of production processes are less and it can be produced with less cost than that of prior art. Since the recess 270 and the cylindrical protrusion 280, which engage each other, are provided on the resistance circuit surface 134 and the contact surface 226, the assembly work becomes simple and further the displacement will not occur between the resistance circuit surface 194 and the contact surface 226 during and after the assembly so that a rotary position detecting device of higher accuracy can be obtained.

As described above, according to the embodiment, a rotary position detecting device which has a simple construction with less number of parts, can be assembled easily and assures a higher detection accuracy, can be provided.

[ Fourth Embodiment]

Figure 6:
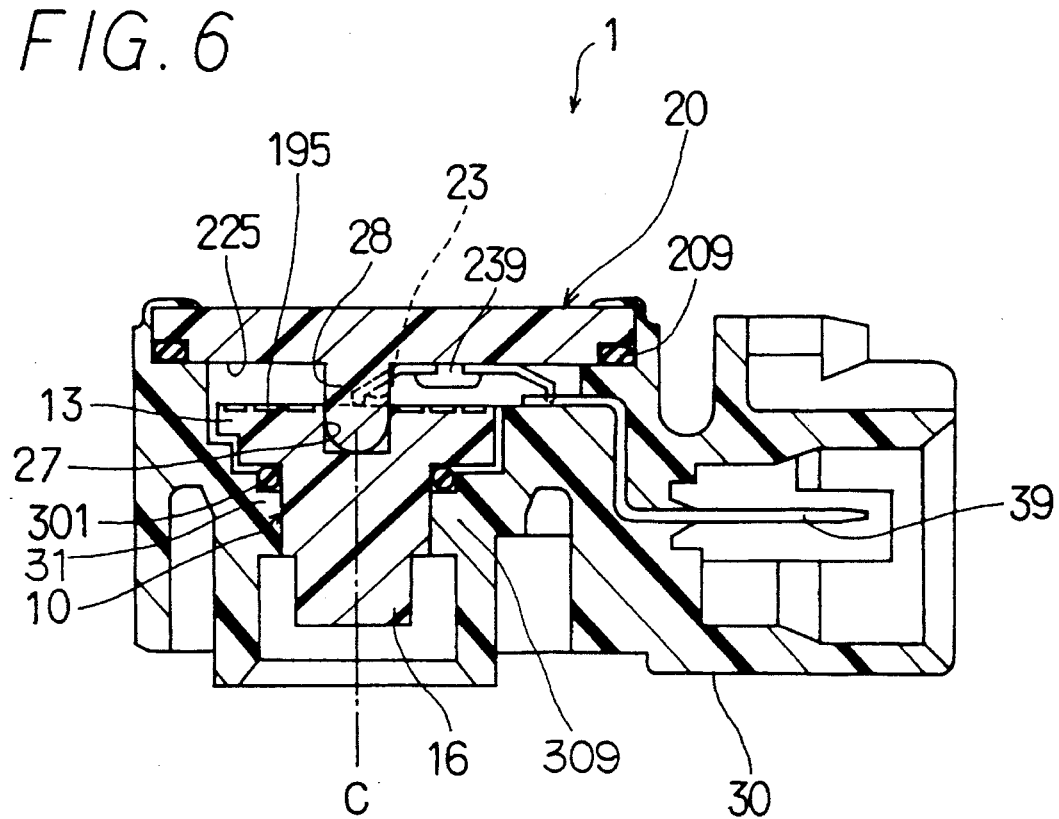
FIG. 6 is a cross-sectional view illustrating a rotary position detecting device according to the fourth embodiment.

This embodiment shown in FIG. 6 is a rotary position detecting device by which the angle of rotation of a shaft 16 is converted to a resistance value. The rotary position detecting device has a rotor 10 made of synthetic resin forming the shaft 16 and a main body 13 as an integral member, a housing 30 which supports rotatably the shaft 16 of the rotor 10, and a cover member 20 made of synthetic resin which is fixed to the housing 30 and disposed opposite to the main body of the rotor 10. On the main body 13 of the rotor 10, a resistance circuit surface 195 which is disposed at right angle against the axial center C of the shaft 16, is formed. On the other hand, on the cover member 20, a detection surface 225 to which the contact 23 contacting the resistance circuit surface 195 is attached and disposed opposite to the resistance circuit surface 195, is formed. Further, on the resistance circuit surface 195, a cylindrical recess 27 having the same axial center C as the shaft 16 is formed and, on the detection surface 225, the protrusion 28 engaging in the recess 27 is formed. An O-ring 301 is inserted between the rotor 10 and the housing 30. Further, the rotor 10 is supported by a bearing 31 of the housing 30. The resistance circuit surface 195 is formed on the upper surface of the main body 13 of the rotor 10 by the screen printing or the like means.

Figure 7:
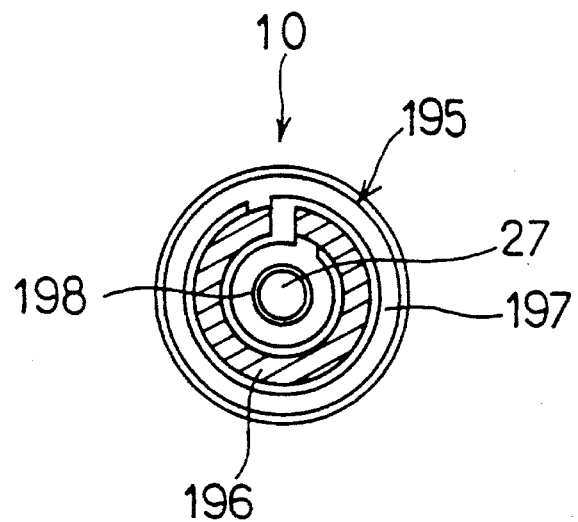
FIG. 7 is a plan view illustrating the rotor of the rotary position detecting device according to the fourth embodiment.
Figure 8:
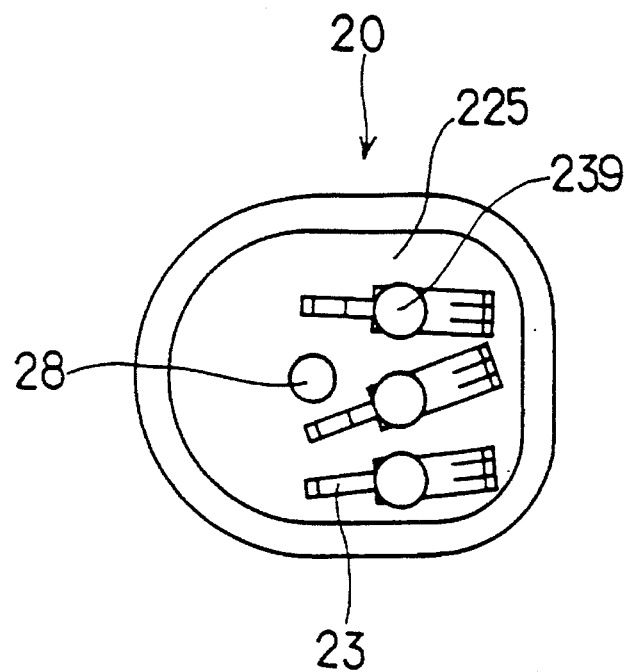
FIG. 8 is a bottom view illustrating a cover member of the rotary position detecting device according to the fourth embodiment.

Resistance circuit surface 195, as shown in FIG. 7, has a resistance surface 196, a ground conductor surface 197 and a power supply conductor surface 198, and the cylindrical recess 27 is formed at the center. On the other hand, the cover member 20 is, as shown in FIG. 6, installed on the housing 30 via a seal member 209 of rubber, etc. Cover member 20, as shown in FIG. 8, has a detection surface 225 to which the contact 23 is attached, and a cylindrical protrusion 28 is formed at the center of the detection surface 225. The protrusion 28 engages in the recess 27. Here, the detection surface 225 is formed as an integral part of the cover member 20. Contact 23 touches each face 196 through 198 of the resistance circuit surface 195. Contact 23 is made of an resilient spring member and contacts the resistance circuit surface 195 with a definite contact force while the other end of the contact touches the terminal plate 39.

Figure 16:
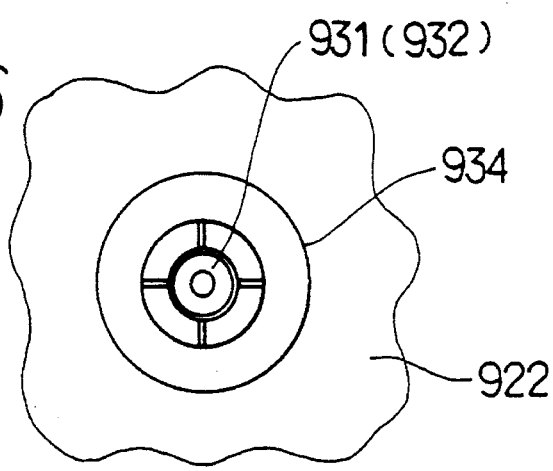
FIG. 16 is a plan view illustrating the fixed state of the contact on the rotary position detecting device according to the prior art.
Figure 17:
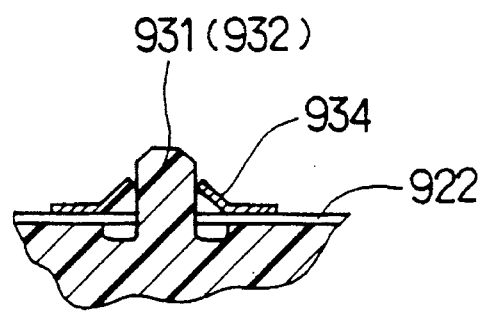
FIG. 17 is a cross-sectional view illustrating the fixed state of the contact of the rotary position detecting device according to the prior art.
Figure 18:
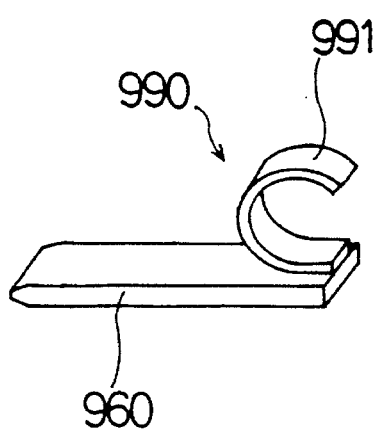
FIG. 18 is a perspective view illustrating a terminal of the rotary position detecting device according to the prior art.

Although the contact 23, as shown in FIG. 6 and FIG. 8, is attached to the cover member 20 by a fixture 239, it may be attached also by the insert formeding or by the conventional snap washer as in FIG. 16. Housing 30 is a member made of synthetic resin to which the terminal plate 39 is attached by the insert formeding, and the bearing 309 is provided around the middle section to support the shaft 16 of the rotor 10. Further, to the upper part, the cover member 20 is fixed by means of the thermal caulking or the like method.

Next, the operation and the effect of the embodiment are described.

Since not only the shaft 16 and the main body 13 of the rotor 10 are molded by a synthetic resin as an integral member, but also the cover member 20 being disposed opposite to the main body 13 of the rotor 10 is molded by synthetic resin, the number of parts as well as the number of the production processes are reduced and thus the production cost decreases. Further, since the resistance circuit 195 is directly printed on the main body 13 of the rotor 10 by the screen printing, the detection surface 225 having the contact 23 which contacts the resistance circuit surface 195, is formed as an integral part of the cover member 20, and the the rotor is supported, at one end, with the bearing 31 of the housing 30 and, at the other end of the rotor 10, with the cover member 20, the number of parts is reduced so that the errors resulting from the assembly of respective parts are reduced. The displacement of relative position between the resistance circuit surface 195 and the contact 23 is prevented. Further, since the rotor 10 is supported with a pair of members of the housing 30 and the cover member 20, the inclination of rotor during revolution is prevented and the accuracy of position detection monitored on the resistance circuit surface 195 and the detection surface 225 is enhanced.

As described above, according to the embodiment, a rotary position detecting device having a simple construction with less number of parts, easily assembled and a higher accuracy can be provided.

[Fifth Embodiment]

Figure 9:
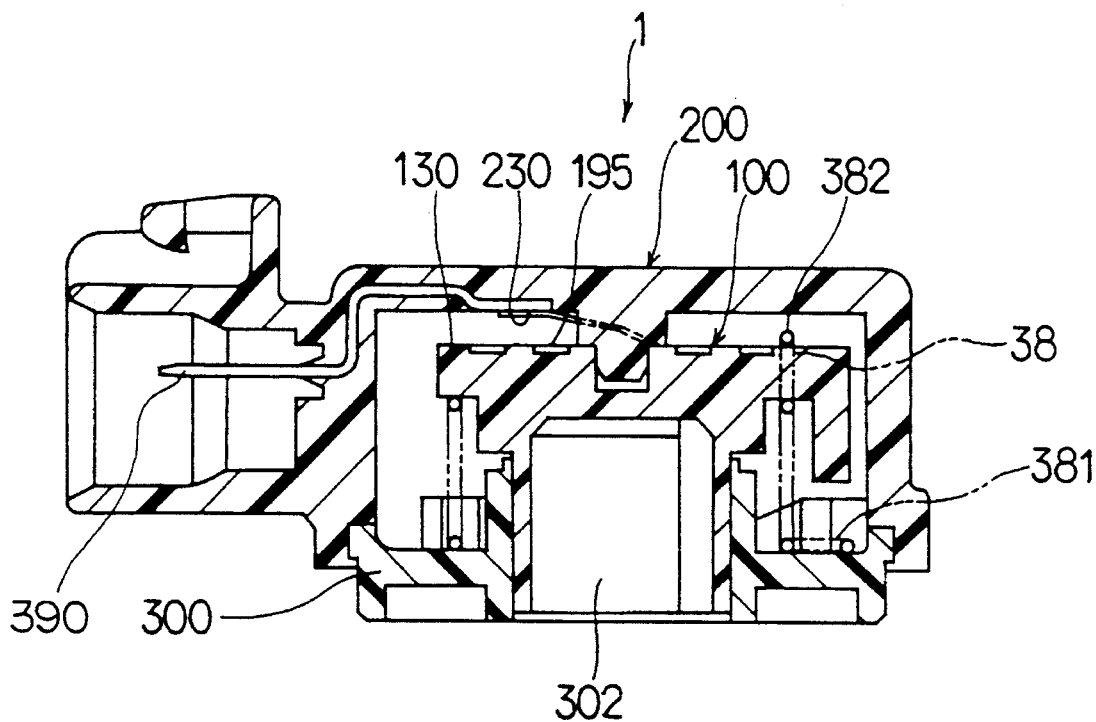
FIG. 9 is a cross-sectional view illustrating a rotary position detecting device according to the fifth embodiment.

The embodiment, as shown in FIG. 9, is another example in which, as a modification of the fourth embodiment, a contact 230 is secured to a terminal plate 390 by welding or the like method and further a return spring 38 is newly added. Return spring 38 is fixed to a housing 300 at one end and to a main body 130 of a rotor 100 at the other end and is designed to return the rotor 100 to its original position. In addition, the rotor 100 is pushed against a cover member 200 with a specified force.

The cover member 200 is secured on the housing 300 by the ultrasonic welding and so the seal member 209 in FIG. 5 is obviated. Contact 230 is fixed to the terminal plate 390 by welding or the like method and so the fixing member 239 used in FIG. 6 is not necessary. A hole 302 for engagement with a revolving object to be detected (valve shaft), which is not shown in the figure is formed in the rotor 100.

Any other sections are same as in the fourth embodiment.

[ Sixth Embodiment]

Figure 10:
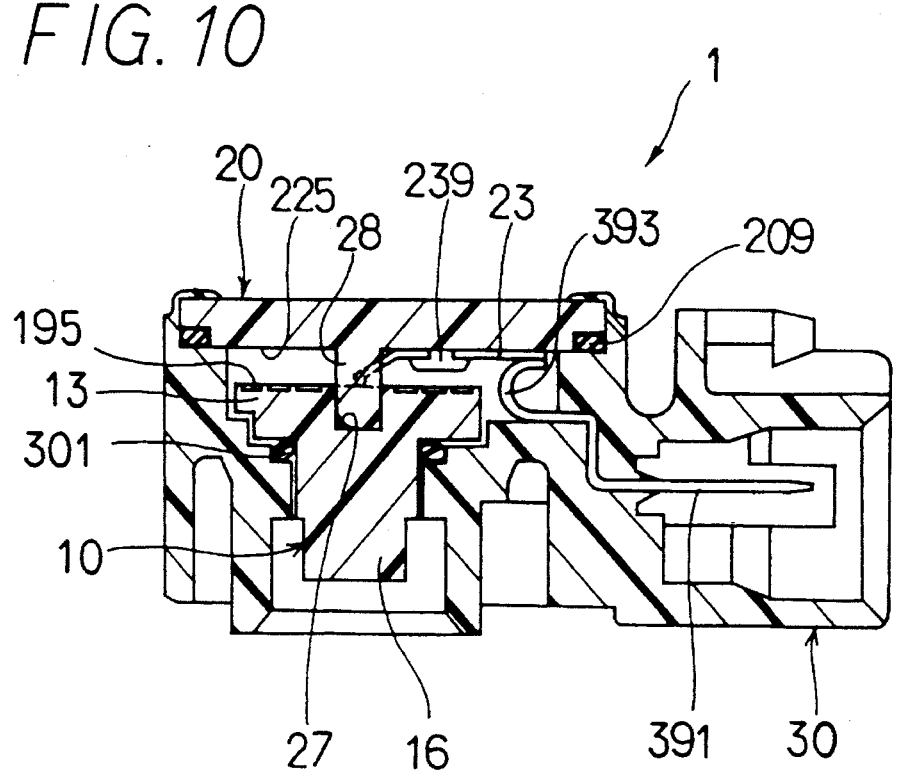
FIG. 10 is a cross-sectional view illustrating a rotary position detecting device according to the sixth embodiment.

This embodiment is, as shown in FIG. 10, a modification of the fourth embodiment, in which it is constructed to provide the resilience to the contact point of the terminal plate 391 with the contact 23. In other words, a bend 393 is formed on the end section if the terminal plate 391 to give a resilience and it is designed to establish an electric contact with the contact 23 according to the force of the bend 393.

[ Seventh Embodiment]

Figure 11:
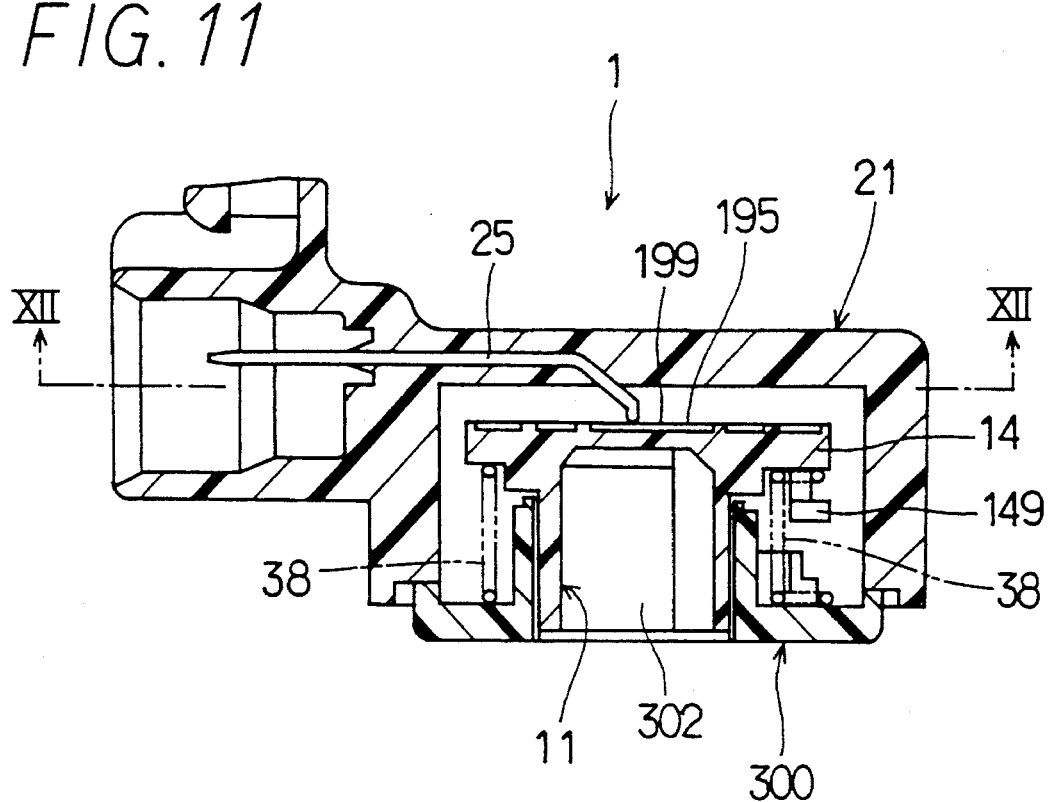
FIG. 11 is a cross-sectional view illustrating a rotary position detecting device according to the seventh embodiment.
Figure 12:
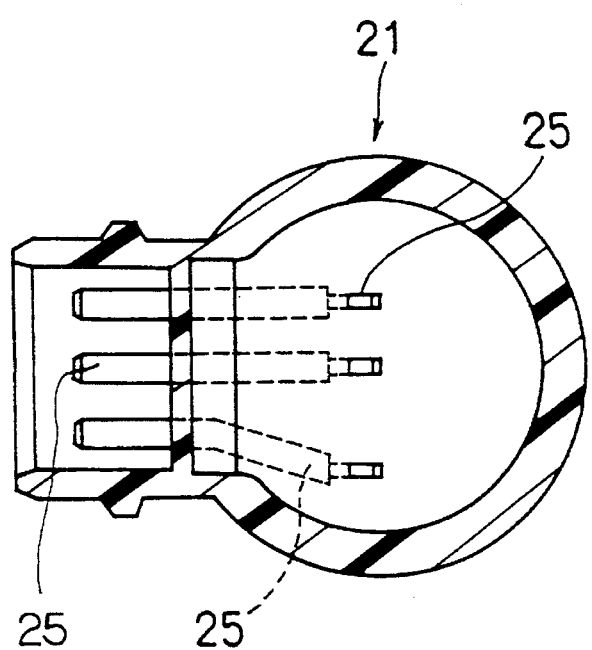
FIG. 12 is a cross-sectional view taken alomg the direction XII—XII in FIG. 11.
Figure 13:
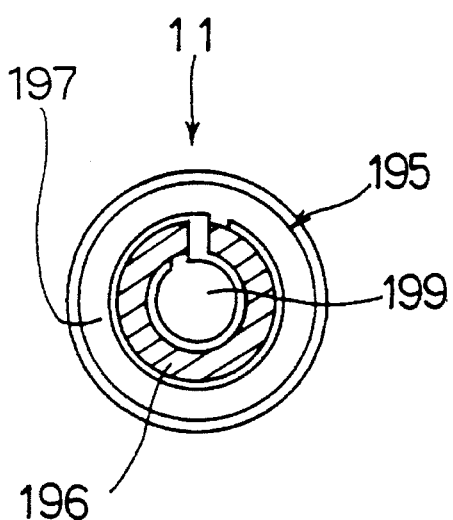
FIG. 13 is a plan view illustrating a rotor of the rotary position detecting device according to the seventh embodiment.
Figure 14:
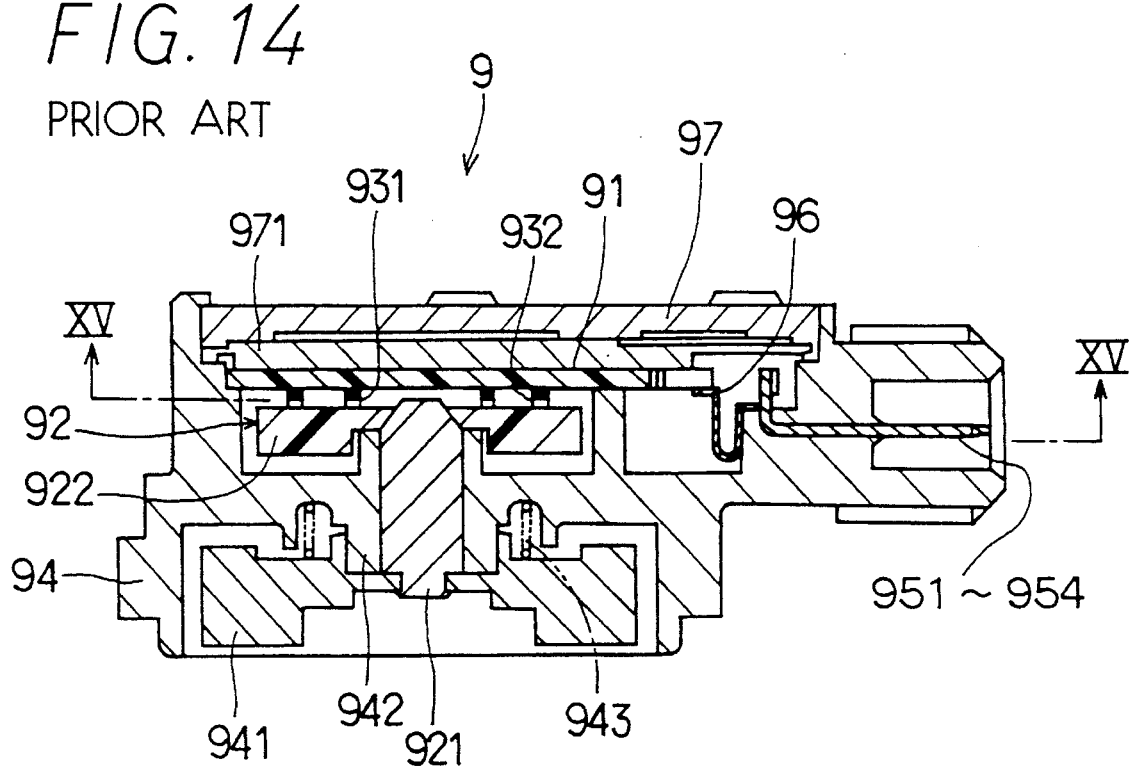
FIG. 14 is a cross-sectional view illustrating a rotary position detecting device according to a prior art.
Figure 15:
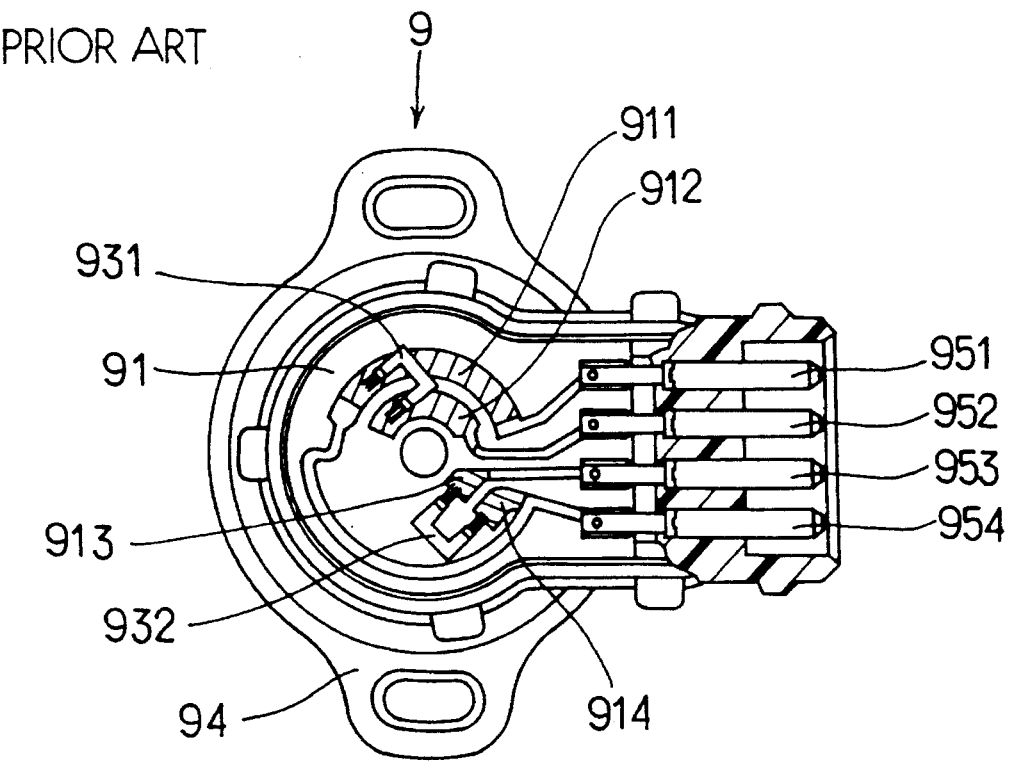
FIG. 15 is a cross-sectional view taken along the direction XV—XV in FIG. 4.

This embodiment is, as shown in FIG. 11, a modification of fifth embodiment, in which a terminal contactor 25 which integrates the terminal plate and the contact, is employed and at the same time the recess and the protrusion are eliminated from a rotor 11 and a cover member 21. In other words, on the cover member 21, the terminal contact 25 which integrates the terminal plate (external connection contact) and the contact, is formed by the insert molding as shown in FIG. 11 and FIG. 12, and the protrusion is eliminated from the surface disposed opposite to the rotor. In addition, the resistance circuit surface 195 of the rotor 11 has, as shown in FIG. 13, a power supply conductor surface 199 at its center but the recess is not provided. Further, as shown in FIG. 11, a stop member 149 to stop the return spring 38 is provided on a main body 14 of the rotor 11.

Since the rotary position detecting device 1 according to the embodiment employs the integral terminal contact, the number of parts as well as the number of assembly process is reduced. In addition, either one of the rotor 11, housing 300 and the cover member 21 is molded of synthetic resin as an integral member, the molding is made easily with a low cost. Any other features are same as in the fifth embodiment.

The present invention having been described hereinabove is not limited to the above embodiments but may be modified in many other ways without departing from the spirit of the present invention.

What is claimed is:

1. A rotary position detecting device for converting an angle of rotation of a shaft into a resistance value, said device comprising:

a rotor made of a synthetic resin and integrating a shaft and a main body thereof;

a housing supporting rotatably one end of said rotor;

a cover member made of a synthetic resin and secured to said housing, said cover member being disposed opposite to said main body of said rotor for circumferentially supporting rotatably another end of said rotor;

a resistance circuit surface disposed at right angle against an axial center of said shaft and formed integrally with said cover member; and a contact surface disposed opposite to said resistance circuit surface and having a contact formed integrally with said main body of said rotor to contact said resistance circuit surface.

2. A rotary position detecting device according to claim 1, wherein one of a recess and a protrusion is formed on one of said resistance circuit surface of said cover member and said contact surface of said main body of said rotor, and wherein another of said protrusion and said recess which engages said one of said recess and said protrusion is provided on another of said contact surface and said resistance circuit surface in order to support the other end of said shaft of said rotor.

3. A rotary position detecting device according to claim 2, wherein said recess is provided on said resistance circuit surface and said protrusion is provided on said contacting surface, and wherein a ring groove and a ring protrusion are formed on said resistance circuit surface and said contacting surface, respectively, for engagement therebetween.

4. A rotary position detecting device for converting an angle of rotation of a shaft into a resistance value, said device comprising:

a rotor formed of synthetic resin and integrating a shaft and a main body thereof;

a housing supporting rotatably one end of said rotor;

a synthetic resin cover member fixed on said housing and disposed opposite to said main body of said rotor for circumferentially supporting rotatably another end of said rotor;

a resistance circuit surface disposed at a right angle against an axial center of said shaft and formed integrally with said main body of said rotor; and a contacting surface disposed opposite to said resistance circuit surface and formed integrally with said cover member.

5. A rotary position detecting device according to claim 4, wherein one of a recess and a protrusion is formed on one of said resistance circuit surface of said cover member and said contacting surface of said main body of said rotor, and wherein another of said protrusion and said recess which engages said one of said recess and said protrusion is formed on another of said contacting surface and said resistance circuit surface in order to support the other end of said shaft of said rotor.

6. A rotary position detecting device according to claim 5, wherein said recess is formed on said resistance circuit surface and said protrusion is formed on said contacting surface.

7. A rotary position detecting device for converting an angle of rotation of a shaft into a resistance value, said device comprising:

a rotor formed of a synthetic resin and integrating a shaft and a main body thereof and forming a resistance circuit surface on said main body;

a housing supporting rotatably said rotor;

a synthetic cover member fixed to said housing and disposed opposite to said main body of said rotor; and a terminal contact mounted on said synthetic cover member and made integrally by an electricity conducting material, said terminal contact making an external contact terminal at one end thereof and contacting said resistance circuit surface at another end thereof.

8. A rotary position detecting device according to claim 7, wherein said main body of said rotor has a base plate which forms said resistance circuit surface on said main body formed integrally with said shaft.

9. A rotary position detecting device according to claim 8, wherein said cover member and said housing are made of same material and joined together by welding.

10. A rotary position detecting device according to claim 9, wherein said shaft of said rotor is mechanically connected to a throttle valve shaft.

11. A rotary position detecting device for converting an angle of rotation of a shaft into a resistance value, said device comprising:

a rotor formed of a synthetic resin and integrating a shaft and a main body thereof;

a housing supporting rotatably one end of said rotor;

a cover member fixed to said housing and disposed opposite to said main body of said rotor for circumferentially supporting rotatably another end of said rotor;

a resistance circuit surface disposed at a right angle against an axial center of said shaft and formed on said cover member; and a contacting surface disposed opposite to said resistance circuit surface, formed on said main body of said rotor and having a contact contacting said resistance circuit surface.

12. A rotary position detecting device according to claim 11, further comprising a spring disposed between a surface of the main body of the rotor and the housing for urging the rotor towards the cover and a stopper for preventing contact between first and second portions of the spring.

* * * * *